(No Model.) 2 Sheets—Sheet 1.
E. J. TOOF.
BUTTONHOLE ATTACHMENT FOR SEWING MACHINES.
No. 590,444. Patented Sept. 21, 1897.
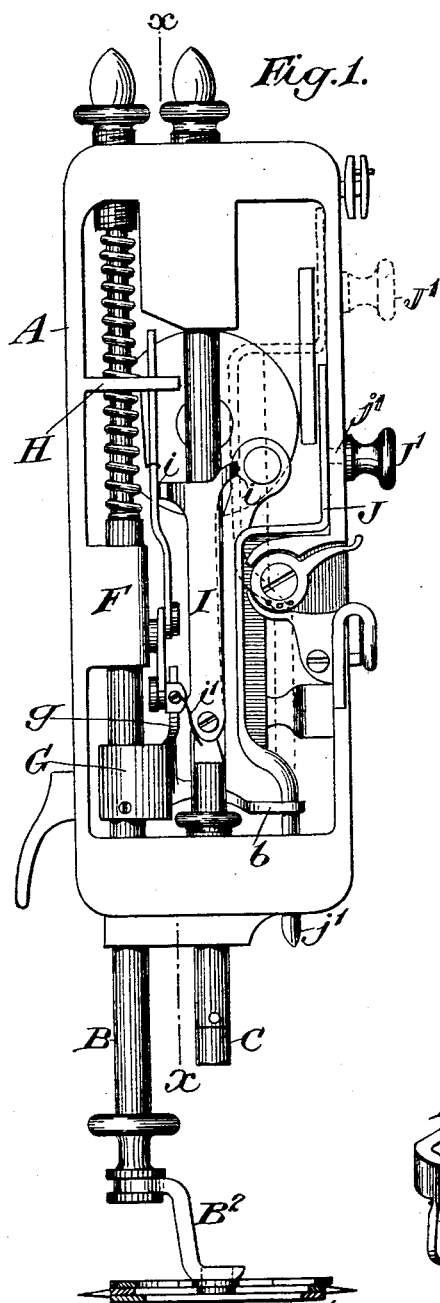
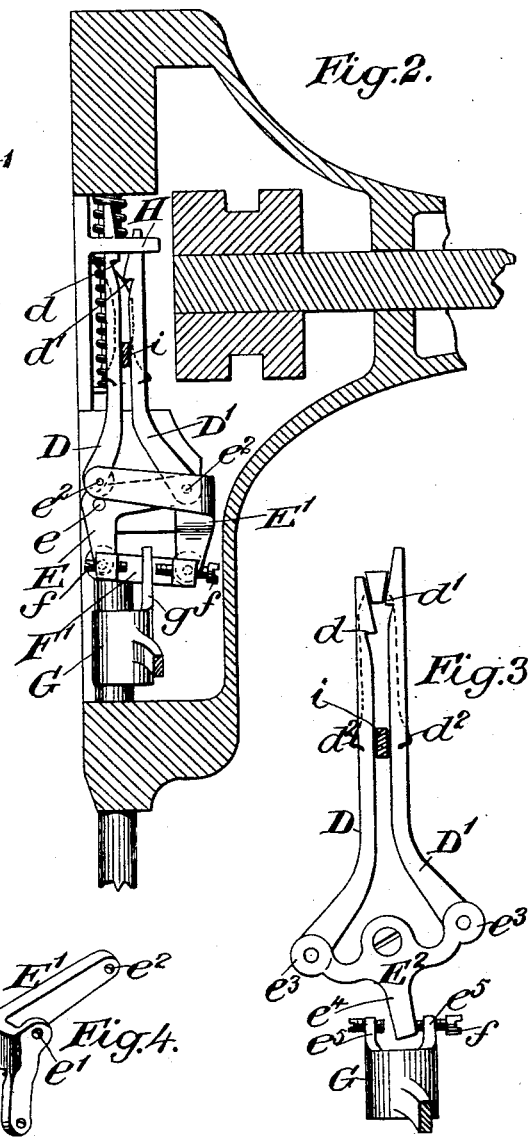
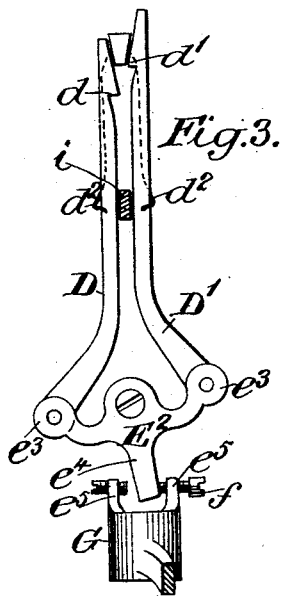

(No Model.) 2 Sheets—Sheet 2.

E. J. TOOF.
BUTTONHOLE ATTACHMENT FOR SEWING MACHINES.

No. 590,444. Patented Sept. 21, 1897.

Witnesses:—

Inventor:—

UNITED STATES PATENT OFFICE.

EDWIN J. TOOF, OF NEW HAVEN, CONNECTICUT.

BUTTONHOLE ATTACHMENT FOR SEWING-MACHINES.

SPECIFICATION forming part of Letters Patent No. 590,444, dated September 21, 1897.

Application filed July 31, 1888. Serial No. 281,599. (No model.)

*To all whom it may concern:*

Be it known that I, EDWIN J. TOOF, a citizen of the United States, and a resident of the city and county of New Haven, State of Connecticut, have invented new and useful Improvements in Sewing-Machines, of which the following description, taken in connection with the drawings herewith accompanying, is a specification.

My invention has for its object to render the ordinary sewing-machine capable of stitching buttonholes whenever required without the necessity of separate attachments.

To this end the invention consists in combining in a single machine with the ordinary stitching mechanism of certain mechanism that may be adjusted at the will of the operator to cause the presser-bar to be operated in a manner to vibrate the foot thereof or a connected attachment and guide the goods containing the buttonhole to properly present the same to the stitching mechanism.

Figure 5:
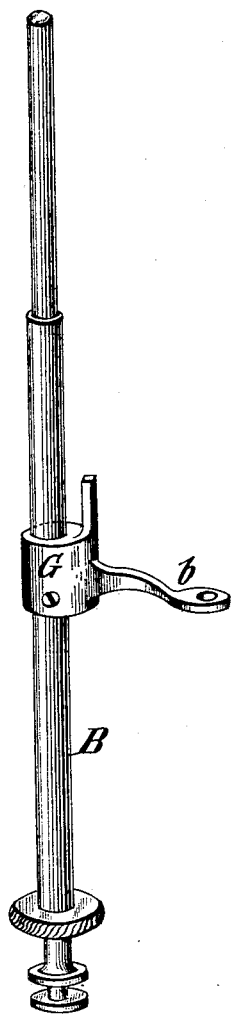
Figure 7:
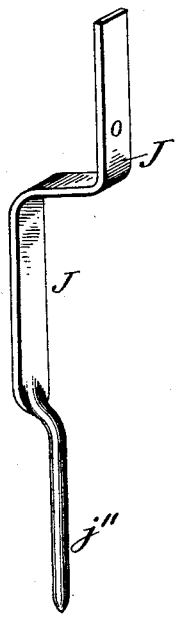
Figure 6:
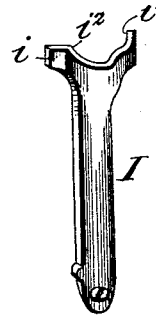

Referring to the drawings, Figure 1 represents an end view of the arm of a sewing-machine embodying my invention with the face-plate removed, showing the position of the parts when the machine is adjusted for ordinary sewing; Fig. 2, a vertical section through line $x\ x$ of Fig. 1; Fig. 3, a detail view illustrating a modification in the presser-foot-operating mechanism; Fig. 4, a perspective view of one of the presser-bar-operating levers; Figs. 5, 6, and 7, perspective views of certain of the parts to be hereinafter referred to.

To explain in detail, A represents the arm of an ordinary sewing-machine, B the presser-bar, and C the needle-bar.

The presser-bar B is loosely supported to slide and turn in its bearings in the arm A, and, according to my present invention, is provided with a fixed collar G thereon, having a short arm $g$, which latter is adapted to be engaged by suitable operating mechanism to oscillate the presser-bar and cause the foot $B^2$ thereof to receive a vibrating movement. The mechanism for thus operating the presser-bar, as shown in Figs. 1 and 2, consists of two elbow-levers E and E', pivotally supported upon a part F of the frame A, with their lower ends united by a connecting-link F', which latter is provided with two lugs having adjusting-screws $f\ f$ supported therein for engaging with the said arm $g$ of the presser-bar, which extends between the same, as more clearly shown in Fig. 2. The opposite or upper ends of the elbow-levers E and E' are pivotally connected with the lower ends of two vertically-arranged levers D and D', which latter at their upper end extends through an opening in a bracket-arm H on the frame A, in which they are loosely supported and guided when operated, as will be described. These levers D and D' are notched or cut away on their inner sides, so as to form two projections $d$ and $d'$, which latter are adapted to be alternately engaged to reciprocate the said levers by the projection or arm $i$ of a rod I, which is pivotally secured at or near its lower end to the needle-bar C, by which latter the said rod is carried. It will be understood by this construction that as the interposed arm $i$ of the rod I is vertically reciprocated between the levers D and D' by the action of the needle-bar the said levers will be alternately engaged, through the medium of their projections $d$ and $d'$, at each upward stroke of said arm $i$ and be raised thereby. Such action of the levers D and D' rocks the connected elbow-levers and causes the link F', connecting the lower ends of the latter, to be vibrated and communicate an oscillating movement to the presser-bar, through the medium of its arm $g$ and the engaging screws $f\ f$, as will be understood.

The levers D and D' are held in yielding engagement with the interposed arm $i$ of the rod I, so as to insure the engagement of the said arm with the projections $d$ and $d'$ of the levers, by means of two spring-arms $d^2\ d^2$, which extend from the arm H and engage with the opposite sides of the said levers, as shown. Any suitable means, however, for yieldingly holding the said levers D and D' in engagement with the arm $i$, when interposed between the same, may be employed without departure from my invention.

When the machine is adapted for ordinary sewing, the rod I is supported in a normal position, with its arm $i$ withdrawn from operative position, between the levers D and D', as shown in Fig. 1, so that no movement will be communicated to the said levers, and consequently the presser-bar will remain stationary. The rod I is adapted to be movably held in its said normal inoperative position by any suitable means, the means as herein shown consisting of a small flat spring $i'$, which is supported by a lug on the needle-bar with one end bearing against one side of the said rod I, as shown. The upper end of the rod I is limited in its lateral movement relative to the needle-bar by means of two arms $i^2 i^2$, as more clearly shown in Fig. 6, which extend from the said rod and partially embrace the opposite sides of the needle-bar. The space between these two arms $i^2 i^2$, from one of which the arm $i$ extends, is sufficient to allow of the latter being moved to and from a position between the levers D and D' for the purpose described.

In order to move the rod I against the pressure of the spring $i'$ and throw its arm $i$ into operative position between the levers D and D', I have provided a device J, (shown in detail in Fig. 7,) which is supported to slide within the frame A, so as to be moved to and from a position for engaging with the said rod I. When this sliding device J, which is operated from the exterior of the frame A by means of an adjusting-screw J' engaging therewith through an elongated slot in said frame, is moved into engagement with the rod I, as shown in dotted lines in Fig. 1, the said rod is moved laterally thereby to move its arm $i$ into operative position between the levers D and D', and the device J extending parallel with the needle-bar throughout the length of movement of the rod I the latter is held thereby in its said operative position.

When the device J is lowered from its engagement with the rod I, as shown in Fig. 1, the said rod is then automatically moved by the spring $i'$ to withdraw its arm from between the levers D and D' and allow the presser-bar to remain stationary. After the presser-bar-oscillating mechanism has thus been rendered inoperative in order to lock the presser-bar from turning in its bearings I have provided the same with a fixed arm $b$, extending from the collar G, secured thereon, which is adapted to be engaged by an extension $j''$ of the sliding device J entering therein opening therein (see Fig. 5) when the said device is lowered to allow the rod I to be moved from its operative position, as described.

The operation of the machine in brief is as follows: When the device J is in a lowered position away from contact with the rod I, as shown in Fig. 1, the mechanism for communicating an oscillating movement to the presser-bar will remain inoperative and the machine will be adapted for ordinary sewing; but when it is desired to use the machine for stitching buttonholes the device J is then raised from engagement with the arm $b$ of the presser-bar to release the latter, and into engagement with the rod I to throw its arm $i$ into operative position between the levers D and D' and operate the latter to communicate an oscillating movement to the presser-bar, as before described. The presser-bar being thus operated will give the foot $B^2$ thereof, to which a suitable cloth-holder B' for carrying the goods to be buttonholed is adapted to be connected, a vibrating movement.

Having thus set forth my invention, it will be obvious that the same may be more or less materially modified without departure from my invention. For instance, in lieu of the two elbow-levers E and E', I sometimes employ a single plate or lever $E^2$, as shown in Fig. 3, which is adapted to be centrally pivoted upon the part F of the frame A, with its two ends $e^3 e^3$ pivotally connected with the lower ends of the levers D and D'. This plate $E^2$, which will receive a rocking movement from the levers D and D', is provided with an arm $e^4$ on its lower side which is adapted to extend and operate between two arms $e^5 e^5$ with which the collar G would be provided in such a construction.

Having thus set forth my invention, what I claim as new, and desire to secure by Letters Patent of the United States, is—

1. In a sewing-machine, the combination with the presser-bar, a vibrating device engaging with said presser-bar or part thereof to operate the same and vibrate the foot carried thereby, vertically-arranged operating-levers connected with said vibrating device and operated by an arm or device carried by the needle-bar, means for moving said arm or device to or from operative position for engagement with said levers, and a cloth-holder for connection with said vibrating presser-foot, substantially as described and for the purpose set forth.

2. In a sewing-machine, the combination with the presser-bar, a vibrating device engaging with said presser-bar or part thereof to operate the same and vibrate the foot carried thereby, means whereby the distance of vibration of said foot may be regulated or adjusted, vertically-arranged operating-levers connected with said vibrating device and a movable arm carried by the needle-bar for operating said levers, and a cloth-holder having connection with said vibrating presser-foot, substantially as described and for the purpose set forth.

3. In a sewing-machine, the combination with the presser-bar having an arm or projection thereon, a vibrating device engaging with said arm or projection to operate the presser-bar and vibrate its foot, operating-levers having connection with said vibrating device, a movable arm or device carried by the needle-bar, means for moving said movable arm into or from position for engaging said operating-levers, and a cloth-holder connected with and operated by the vibrating presser-foot, substantially as described and for the purpose set forth.

4. In a sewing-machine, the combination with the presser-bar, a vibrating device for engaging with said presser-bar or part thereof to operate the same and vibrate the foot carried thereby, vertically-arranged operating-levers connected with said vibrating device, a movable device carried by the needle-bar for engaging with and operating said levers, means for moving the same into or from position for operating said levers, a device for locking the presser-bar from rotary movement, and a cloth-holder, substantially as described and for the purpose set forth.

5. In a sewing-machine, the combination with the presser-bar provided with an arm or extension projecting therefrom, a vibrating device engaging with said presser-bar or part thereof to operate the same and vibrate its lower extension or foot, operating-levers connected with said device, a movable device carried by the needle-bar adjustably held in position for engaging with and operating said levers, a sliding device for releasing said movable device from its operating position and engaging with the said arm or extension of the presser-bar, and a cloth-holder, substantially as described and for the purpose set forth.

6. In a sewing-machine, the combination with the presser-bar, a vibrating device for operating said presser-bar to vibrate its foot, operating-levers connected with said vibrating presser-bar, a pivoted arm carried by the needle-bar for engaging with and operating said levers, a spring for elastically holding said pivoted arm from operative position, a sliding device for moving said arm into operative position, and a cloth-holder for connection with the presser bar or foot, substantially as described and for the purpose set forth.

7. In a sewing-machine, the combination with the presser-bar, of means for operating the same to impart a vibrating movement to the foot or device carried thereby, operated by an arm or device carried by the needle-bar, means for holding said device carried by the needle-bar in, and away from, operative position for engaging with said presser-bar-operating means, and a cloth-holder for connection with the presser-foot, substantially as described and for the purpose set forth.

EDWIN J. TOOF.

Witnesses:
   CHAS. F. DANE,
   E. J. CUNNINGHAM.